United States Patent [19]

Sashiki et al.

[11] 4,441,569

[45] Apr. 10, 1984

[54] WEIGHING APPARATUS

[75] Inventors: Takashi Sashiki, Nagaokakyo; Masaaki Matsuno, Kyoto; Noboru Kobayashi, Shiga; Yoshiharu Mikami, Kyoto, all of Japan

[73] Assignee: Kabushiki Kaisha Ishida Koki Seisakusho, Japan

[21] Appl. No.: 372,706

[22] Filed: Apr. 28, 1982

[30] Foreign Application Priority Data

Apr. 28, 1981 [JP] Japan .............................. 56-62474[U]

[51] Int. Cl.³ .............................................. G01G 3/14
[52] U.S. Cl. .................................. 177/211; 73/862.65; 177/229; 177/238
[58] Field of Search ............... 177/211, 180, 183, 229, 177/238; 73/862.65; 338/2

[56] References Cited

U.S. PATENT DOCUMENTS

| 1,702,741 | 2/1929 | Mojonnier | 177/183 |
| 3,180,139 | 4/1965 | Soderholm | 73/862.65 |
| 3,512,595 | 5/1970 | Laimins | 177/211 X |
| 4,146,100 | 3/1979 | Jacobson | 177/211 |
| 4,196,784 | 4/1980 | Suzori | 177/211 |

Primary Examiner—Joseph W. Hartary

[57] ABSTRACT

A weighing apparatus of the type which weighs articles through use of a load cell having strain gauges attached thereto, the apparatus including a sealed vessel filled with a liquid of a specific gravity greater than unity for housing the load cell which is immersed in the liquid, a diaphragm provided on the sealed vessel so as to close an opening formed in a portion of the vessel, a supporting member for supporting a container carrying the articles to be weighed, and a connecting member for mechanically connecting the supporting member with a load-receiving portion of the load cell through the intermediary of the diaphragm.

7 Claims, 5 Drawing Figures

WEIGHING APPARATUS

BACKGROUND OF THE INVENTION

This invention relates to a weighing apparatus and, more particularly, to a weighing apparatus which incorporates a load cell of the type having strain gauges affixed thereto.

Load cells of the so-called bending beam-type may be employed as weight sensors for converting the magnitude of an applied load into an electrical signal. A load cell of such type includes a stationary mounting portion, a portion for receiving the applied load, and a pair of parallel, flexible beams which connect the mounting and load-receiving portions to each other. Each beam is reduced in thickness at two separate points, and has a strain gauge affixed thereto at each such point, for a total of four strain gauges in the load cell. The four strain gauges are connected in the form of a bridge circuit, with each gauge arranged in one arm of the bridge. A constant voltage is applied across one pair of opposing junctions through a resistor, and an electric signal corresponding to the magnitude of the load applied to the load cell is obtained from across the other pair of opposing junctions. Thus, when a load is applied to the load-receiving portion of the load cell with a constant voltage applied across one pair of opposing junctions, a potential difference develops across the other pair of opposing junctions owing to a change in the resistance of each strain gauge which measures the strain developed in the beams of the load cell, the strain corresponding to the magnitude of the applied load. Sensing the potential difference makes it possible to detect the magnitude of the load.

It is conventional practice to install a load cell of the above type in a weighing apparatus in an exposed condition. As a result, oxides tend to form on the strain gauges owing to oxidation caused by water droplets and other sources of moisture. Chlorides also are likely to form on the strain gauges. Since a result of the oxidation and the chloride formation is a change in the resistance of the strain gauges, correct weight measurement cannot be performed. In addition, external moisture and contaminants in the atmosphere can also degrade and corrode the strain gauges which, with time, may no longer be able to function properly. The problem is particularly acute in weighing machines having load cells, if these machines must be washed with water periodically. The load cells in such machines are wet quite often and quickly deteriorate both physically and electrically.

Thus it has not been possible to use the conventional load cell effectively in locations where the humidity is high, the atmosphere is contaminated, or in machines that must be washed with water.

Various methods for protecting strain gauges have been proposed, one of which is coating the strain gauges with a resin and another is disposing a load cell in a gas sealed within a closed vessel. However, as to a former, the resin which has adequate dampproof- and waterproof-characteristic cannot be found. And as to the latter, there is the problem of gas-leakage and a structure which can prevent the gas from leaking is complicated.

BRIEF SUMMARY OF THE INVENTION

Accordingly, an object of the present invention is to provide a weighing apparatus which will not be adversely affected by external moisture, water droplets or a corrosive environment, the apparatus including strain gauges which will neither corrode nor undergo a deterioration in electrical characteristics.

Another object of the present invention is to provide a weighing apparatus in which a weight sensor, such as a load cell, is maintained in a condition free of moisture, water and dust by immersing the sensor in a liquid having a specific gravity greater than unity and sealed within a closed vessel of predetermined dimensions.

Other features and advantages of the invention will be apparent from the following description taken in conjunction with the accompanying drawings, in which like reference characters designate the same or similar parts throughout the figures.

DESCRIPTION OF THE PREFERRED EMBODIMENTS

Figure 1:
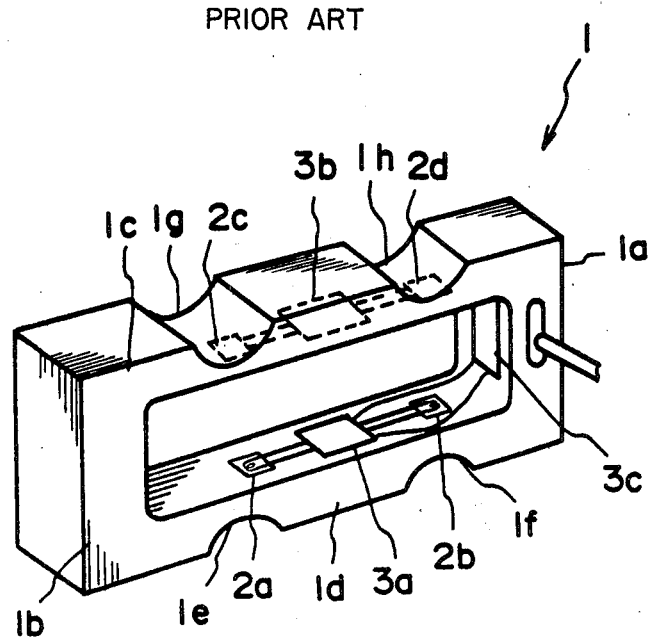
FIG. 1 is a perspective view of a load cell.
Figure 2:
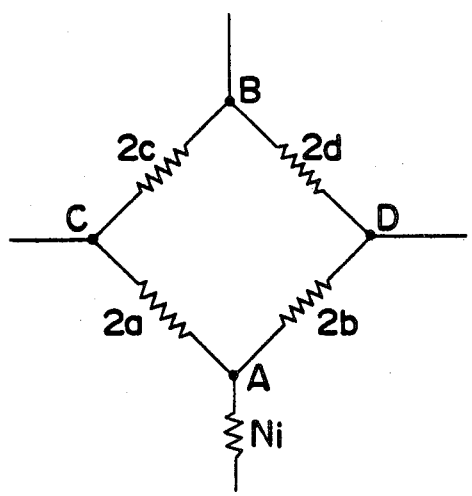
FIG. 2 is a diagram of a bridge circuit.

As shown in FIG. 1, a load cell, indicated generally by numeral 1, includes a portion 1a for affixing the cell, a portion 1b for receiving an applied load, and parallel, flexible beams 1c, 1d which interconnect the mounting portion 1a and load-receiving portion 1b. The beams 1c, 1d have portions of reduced thickness 1e, 1f, 1g, 1h, and strain gauges 2a, 2b, 2c, 2d affixed thereto at the positions corresponding to the reduced thickness portions 1e, 1f, 1g, respectively. Substrates 3a, 3b, 3c are attached to the load cell 1 to connect the strain gauges 2a, 2b, 2c, 2d into the form of a bridge, which is schematically depicted in FIG. 2. A constant voltage is applied across the opposing junctions A, B of the bridge, shown in FIG. 2, through a resistor $N_i$. The potential difference developed across the other pair of opposing junctions CD is read and interpreted as indicating the magnitude of the load applied to the load all.

Figure 3:
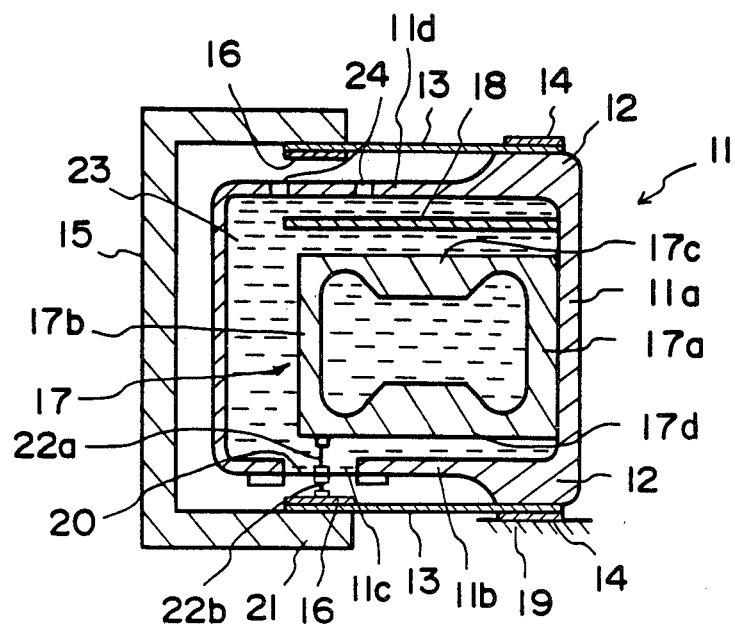
FIG. 3 is a sectional view showing a first embodiment of a weighing apparatus according to the present invention.

Referring now to FIG. 3, a sealed vessel, indicated by numeral 11, is formed to include protruding portions 12 as its upper and lower surfaces. Leaf springs 13 are attached to respective ones of the protruding portions 12 by means of fixtures 14. The leaf springs 13 project forward from the protruding portions 12 and extend in parallel. The free ends of the leaf springs 13 are affixed to respective arms of a substantially C-shaped supporting frame 15 by means of fixtures 16, whereby the supporting frame 15 is supported by the leaf springs 13. Accommodated within the sealed vessel 11 is a rectangular load cell 17 having a mounting portion 17a affixed to a side wall 11a of the vessel 11 in such a manner that the load cell is supported in a cantilever fashion, parallel to the leaf springs 13. The load cell 17, in addition to the mounting portion 17a, includes a load-receiving portion 17b, as well as parallel upper and lower beams 17c, 17d both having the same length and which interconnect the portions 17a, 17b, as described earlier. An amplifier substrate 18 is attached to a side wall 11a of the vessel at a point above the load cell 17 and extends parallel to the load cell 17. The sealed vessel 11 is secured at the protruding portions 12 to a frame 19 so as to be supported in cantilever fashion on the frame 19. The sealed vessel 11 further includes a lower wall 11b having an opening 11c of a prescribed size immediately below the load-receiving portion 17b of the load cell 17. A diaphragm 20 is affixed to the lower wall 11b of the sealed vessel 11 to close the opening 11c. A weighing hopper, not shown, is attached to a supporting frame 15 at a weighing point 21 which is in line with the free ends of the parallel leaf springs 13. The weighing portion 21 of the supporting frame is mechanically connected to the lower surface of the weight-receiving portion 17b of the load cell 17 by means of wires 22a, 22b. Wire 22a provides the connection between the diaphragm and weight-receiving portion, and wire 22b provides the connection between the diaphragm and the supporting frame. A liquid 23 comprising oil having a specific gravity greater than unity is sealed within the vessel 11. A plurality of holes 24, which ordinarily are closed by suitable means, are formed in the upper wall 11d of the sealed vessel 11 at a prescribed portion thereof for the purpose of changing the oil when required. Strain gauges, not shown, are affixed to the upper and lower beams 17c, 17d at prescribed locations for delivering electric signals corresponding to the load that will be applied to the weighing portion 21 of the load cell.

In operation, the weighing portion 21 of the supporting frame 15 is subjected to a load, namely to the weight of articles disposed in the weighing hopper, not shown. The load causes vertical displacement of the supporting frame 15, which displacement is transmitted to the load-receiving portion 17b of the load cell 17 via the wires 22a, 22b and diaphragm 20. The load-receiving portion 17b of cell thus is displaced downwardly by an amount proportional to the load, thereby enabling the load to be detected.

According to the foregoing construction, any water or foreign matter that might happen to penetrate the sealed vessel 11 will float on the surface of the liquid 23 owing to its specific gravity, which is greater than unity, and therefore will not contact the load cell 17. Any water or foreign matter found floating on the oil can be removed through the holes 24 after uncovering the holes as required.

Figure 4:
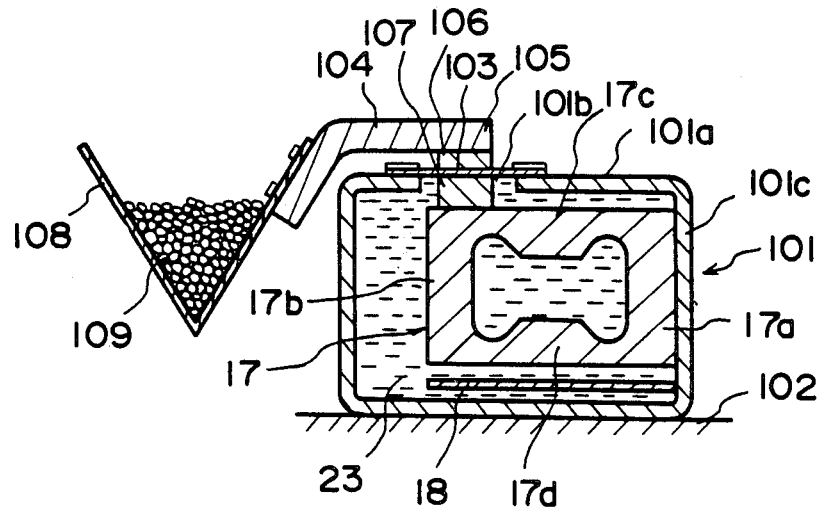
FIG. 4 and FIG. 5 are respectively sectional views showing a second embodiment of a weighing apparatus according to the present invention.

Another embodiment of the present invention is shown in FIG. 4. In this arrangement a sealed vessel, indicated by numeral 101, has an opening 101b of a prescribed size formed in an upper wall 101a thereof and is fixedly secured to a frame 102. The load cell 17 has its mounting portion 17a affixed to a side wall 101c of the vessel 101 so that the cell is supported in cantilever fashion within the vessel. Also attached to the side wall 101c of the vessel 101 is the amplifier substrate 18, which in this case underlies the load cell 17. A diaphragm 103 is affixed to the upper wall 101a of the vessel 101 to close the opening 101b. A weighing portion 105 of a supporting frame 104 is mechanically connected to the upper beam 17c of the load cell 17 by means of pressing members 106, 107 which sandwich the diaphragm 103 therebetween. As in the first embodiment, the sealed vessel 101 contains a liquid comprising oil 23, of a specific gravity greater than unity. Thus, as described above, any water or foreign matter which penetrates the sealed vessel 101 will float on the surface of the liquid 23 and collect at the upper portion of the vessel, and therefore will not affect the load cell 17.

In FIG. 4. numeral 108 denotes a weighing hopper which is secured to a curved arm formed on the supporting frame 104. Numeral 109 denotes the articles which are to be weighed. As is the first embodiment, the supporting frame 104 is displaced owing to the load, or weight, of the articles loaded in the hopper 108. The displacement of the supporting frame 104 is transmitted to the free end of the load cell 17 via the pressing members 106, 107 and diaphragm 103. The displacement is detected by strain gauges, not shown, affixed to the load cell. The signals from the strain gauges provide an electrical indication of the weight of the articles 109.

Figure 5:
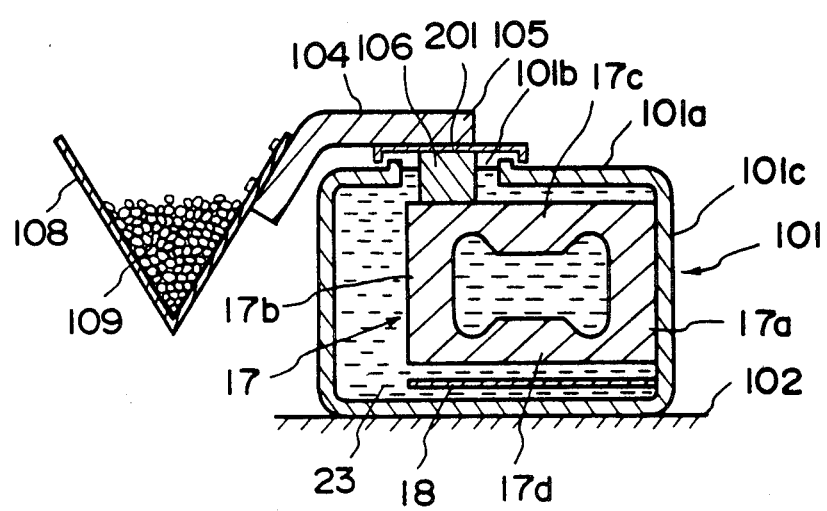

In FIG. 5, an embodiment using a cover-portion instead of the diaphram is disclosed, in which same parts as the embodiment of FIG. 4 are denoted by the same symbols. Numeral 201 denotes a cover-portion, through which the weighing portion 105 of the supporting frame 104 is mechanically connected to the upper beam 17c of the load cell 17. In this case, the vessel is not sealed.

Thus, in accordance with the present invention as described and illustrated hereinabove, a liquid of a specific gravity greater than unity is sealed within a vessel of prescribed dimensions, a weight sensor such as a load cell is accommodated within the sealed vessel and immersed in the liquid, and a frame for supporting a weighing hopper or the like is mechanically connected to the sensor through a diaphragm which closes an opening formed in a portion of the sealed vessel. Such an arrangement prevents water and foreign matter from invading the interior of the vessel even if the vessel is washed. Moreover, in the event that any water or foreign matter should manage to penetrate the vessel, the specific gravity of the sealed liquid assures that the water or other matter will float and collect at the top of the vessel and will not affect the sensor. Also, if the liquid in which the sensor is immersed is oil or a similar substance, elements such as strain gauges or the like will not develop deposits of chlorides and will not be oxidized by water droplets, moisture or harmful gases that may exist in the vicinity of the weight sensor. This protects the strain gauges against deterioration and corrosion and attendant changes in electrical characteristics, thereby assuring a high degree of measuring accuracy.

Also in accordance with the present invention, the distance between the strain gauges and the amplifier substrate can be made smaller and therfore the wiring distance between them can be shorter. In consequence, noises picked up by the wires between the strain gauges and the amplifier substrate are reduced.

Furthermore, when the load cell and the amplifier substrate are enclosed by the vessel, noises due to external sources can be excluded from the weighing apparatus according to the present invention due to an electrostatic shielding effect. Thus, according to the present invention, one can obtain a weighing apparatus which is resistant to noises and has electrostatic shielding effect.

As many apparently widely different embodiments of the present invention may be made without departing from the spirit and scope thereof, it is to be understood that the invention is not limited to the specific embodiments thereof except as defined in the appended claims.

What we claim is:

1. A weighing apparatus for weighing articles through use of a weighing hopper and a load cell having strain gauges attached thereto, said weighing apparatus comprising:

a load cell having a load-receiving portion;
an amplifier substrate arranged adjacent to said load cell;

a vessel for holding a liquid of a specific gravity greater than unity, and having the load cell and the amplifier substrate attached thereto, said vessel having an opening formed in a portion therof;

a cover-portion disposed on said vessel so as to cover the opening;

a supporting member for supporting the weighing hopper for holding the articles to be weighed; and a connecting member for operatively connecting said supporting member, said load-receiving portion of the load cell and said cover-portion.

2. The weighting apparatus according to claim 1, wherein said cover-portion is a diaphram.

3. The weighing apparatus according to claim 2, wherein said vessel has first and second protrusions respectively formed on first and second surfaces of said vessel, and wherein said apparatus further comprises:

a pair of leaf springs respectively secured at one end thereof to corresponding ones of said protrusions, the free ends of said leaf springs being affixed to respective portions of said supporting member.

4. The weighing apparatus according to claim 2 or claim 3, wherein said diaphragm is affixed to a bottom portion of the vessel, and said connecting member comprises first and second wires, said supporting member being mechanically connected with said diaphragm by said first wire, said diaphragm being mechanically connected with the load receiving portion of the load cell by said second wire.

5. The weighing apparatus according to claim 1, wherein said cover-portion is affixed to an upper portion of the vessel.

6. A weighing apparatus for weighing articles through use of a weighing hopper and a load cell having strain gauges attached thereto, said weighing apparatus comprising:

a load cell having a load-receiving portion;

an amplifier substrate arranged adjacent to the load cell;

a vessel for holding a liquid having a specific gravity greater than unity, having the load cell and the amplifier substrate attached thereto and having an opening formed in a portion thereof and protrusions formed on a first and a second surface thereof;

a cover-portion disposed on said vessel so as to cover the opening;

a pair of leaf springs, each fixed at one end thereof to a respective one of said protrusions;

a C shaped supporting member having the ends of the C affixed to the free ends of respective ones of said leaf springs, for supporting the weighing hopper where the articles to be weighed are placed;

a connecting member, operatively connecting said supporting member, said load-receiving portion of the load cell and said cover-portion.

7. A weighing apparatus according to claim 6, wherein said cover-portion is a diaphram.

* * * * *

UNITED STATES PATENT AND TRADEMARK OFFICE
CERTIFICATE OF CORRECTION

PATENT NO. : 4,441,569
DATED : April 10, 1984
INVENTOR(S) : SASHIKI ET AL.

It is certified that error appears in the above-identified patent and that said Letters Patent is hereby corrected as shown below:

Column 5, line 12, "weighting" should be --weighing--;
line 13, "diaphram" should be --diaphragm--.

Signed and Sealed this

Nineteenth Day of March 1985

[SEAL]

Attest:

DONALD J. QUIGG

Attesting Officer   Acting Commissioner of Patents and Trademarks